United States Patent Office 3,245,810
Patented Apr. 12, 1966

3,245,810
PRINTING COMPOSITION, ITS PREPARATION AND USE, AND REGENERATED CELLULOSE ARTICLE IMPRINTED THEREWITH
Hans Heiss, Karl Lendle, and Erich Zorn, Wiesbaden-Biebrich, Germany, assignors to Kalle Aktiengesellschaft, Wiesbaden-Biebrich, Germany, a corporation of Germany
No Drawing. Filed Sept. 10, 1963, Ser. No. 307,774
Claims priority, application Germany, Jan. 18, 1957,
K 30,857
2 Claims. (Cl. 106—27)

This application is a continuation-in-part of our copending application Serial No. 709,187, filed January 16, 1958, now abandoned.

The invention described in the present application refers to a printing composition for regenerated cellulose articles, especially for regenerated cellulose sausage casings. It is one of the objects of the invention to provide for a priting composition which when printed on a regenerated cellulose surface and allowed to harden by exposure to air, will show a sufficient adhesion to the regenerated cellulose surface even after the printed surface has been dipped into boiling water for at least 10 minutes. Another object of the invention is a process for preparing a printing composition of the above stated qualities. Still another object is a process for imprinting a surface of regenerated cellulose, especially of a regenerated cellulose sausage casing, such that the signs printed on said surface will sufficiently adhere to it even after being dipped into boiling water for at least 10 minutes. A further object of the invention is a regenerated cellulose sausage casing imprinted in the aforementioned manner.

Various methods have previously been known for printing on shaped bodies of regenerated cellulose, e.g., on films of regenerated cellulose such as are widely used as packaging material, or on tubes of regenerated cellulose serving as sausage casings. The specific printing method used generally depends on the intended use of the printed regenerated cellulose body in question.

However, all methods generally used heretofore possess certain disadvantages, which become apparent during or after the printing process. The most common of these disadvantages is the fact that the common printing inks have a relatively slow drying capacity; furthermore, their adhesion to the surface of the regenerated cellulose body is poor.

These disadvantages become especially apparent in regard to regenerated cellulose tubes adapted to be used as sausage casings. For this reason, after sausage casings of regenerated cellulose had been imprinted, a special process step consisting of a high-temperature treatment in a humid atmosphere of the printed tubes was hithertto indispensable, if the adhesion of the printing ink to the sausage casing should meet the most exacting conditions. This after-treatment, which causes a sufficient adhesion of the print to the regenerated cellulose body, its fastness to abrasion and boiling— qualities which are required by the customer—has a disadvantageous effect on the regenerated cellulose casing itself, as it reduces the strength of the casing and causes brittleness of the edges thereof.

Moreover, this after-treatment produces other undesirable effects. For example, the unimprinted areas of the regenerated cellulose casing which before had been transparent and clear, become slightly brownish after the after-treatment; in addition, the lustre of the printing inks is materially dulled. In many cases, the shades of the pigments added to the printing ink are altered, so that the finished print does not correspond to the shade requested by and agreed upon with the customer.

It has now been found that the above disadvantages can be substantially overcome and the adhesion of printing inks to regenerated cellulose surfaces can be improved by the use of a printing composition which essentially consists of an intimate mixture of a drying oil-printing ink and an organic isocyanate having at least two reactive isocyanate groups in its molecule, in an amount sufficient to cause, after air-drying, an adhesion of the ink to a regenerated cellulose surface, which is fast to boiling water without supplementary treatment.

Drying oil printing inks which are a component of the composition of the invention are well-known to the man of the art. They consist, in essence, of a pigment or a mixture of pigments, a vehicle drying by oxidation, and a drying agent or a mixture of drying agents. Vehicles drying by oxidation consist mainly of a drying oil or a mixture of drying oils. Such oils, usually of vegetable origin, but in some cases of animal or synthetic nature, oxidize and polymerize when exposed to the air in a thin film, leading ultimately to a solid, tough, but flexible film. The drying oil of the printing ink vehicle may be linseed oil, tung oil (china wood oil), perilla oil, oiticica oil, soybean oil, and synthetic drying oil of petroleum origin. Chemically modified drying oils, such as dehydrated castor oil or drying animal oil modified to free it from objectionable odor are further examples. In most cases, the drying oils used in the printing inks are bodied oils.

According to the invention, an organic isocyanate having at least two reactive isocyanate groups in its molecule is intimately mixed with a drying oil printing ink. Such isocyanates are well known. A group of polyvalent isocyanates which are available on the market and, therefore, are preferably used in the practical realization of the objects of the invention, are represented by hydrocarbon diisocyanates. Many of these are known and listed in the following catalogue of polyvalent isocyanates. Another group of isocyanates which are available on the market and, therefore, preferably used when realizing the invention are the products of a reaction of a hydrocarbon diisocyanate with a polyhydric alcohol in such proportions that the reaction product contains at least two reactive isocyanate groups per molecule. The presence of at least two reactive isocyanate groups per molecule of isocyanate compound is one of the important features of the printing composition according to this invention. By this feature, the present printing composition is different from drying oil vehicles which are known in the art of paints for brushing wood, in which known drying oil vehicles part of the drying oil is converted into an oil having a free hydroxyl group and the converted oil is reacted with a diisocyanate in order to enhance the viscosity of the vehicle which, after such diisocyanate reaction has, of course, no reactive isocyanate groups in its molecules. The same difference is true with the known drying oil vehicles in which natural free hydroxyl groups of drying oil have been reacted with diisocyanates. If, as above stated, a reaction product of a hydrocarbon diisocyanate and a polyhydric alcohol is used as a polyvalent isocyanate, the reaction by which the reaction product is produced must be performed with more than one mole of hydrocarbon diisocyanate per each two equivalents of free hydroxyl groups.

For instance, the reaction product of the reaction of 3 moles of 1-methyl-2,4-phenylene diisocyanate with 1 mole of 1,3-dimethyl-1,3-dihydroxy-2-hydroxymethyl propane, having in the main the formula

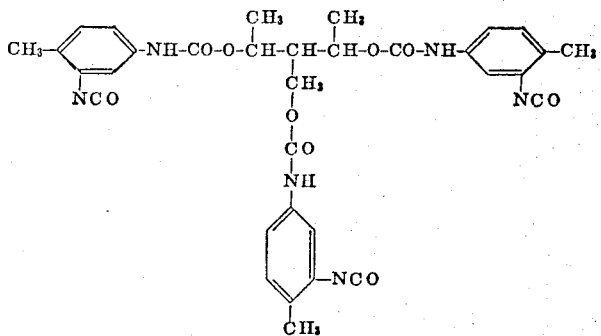

has proved a valuable component of the printing composition according to the present invention. As another polyvalent isocyanate compound the product of a reaction of 3 moles 1-methyl-2,4-phenylene diisocyanate with 1 mol tris(hydroxy-methyl)-propane, having in the main the formula

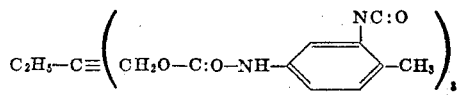

has been used as a polyvalent isocyanate in the sense of the invention and has proved successful, the same as methyl-phenylene isocyanates, such as 1-methyl-2,4-phenylene isocyanate and 1-methyl-2,6-phenylene isocyanate or mixtures thereof, or as 1,6-hexamethylene diisocyanate.

There are, of course, isocyanates having 2 or more reactive isocyanate groups per molecule other than those derived from hydrocarbon isocyanates, which are also useful in the sense of this invention, for instance ether isocyanates, thioether isocyanates, heterocyclic isocyanates and substituted hydrocarbon isocyanates, the substituents being, e.g. an alkoxy group, halogen atom, or a nitro group.

Organic isocyanates having at least two reactive isocyanate groups per molecule, which may be used as the isocyanate component when realizing the object of the invention, are listed below:

1,2-ethylene diisocyanate
1,3-trimethylene diisocyanate
1,4-tetramethylene diisocyanate
1,4-(2-methyl-tetramethylene)-diisocyanate
1,5-penta methylene diisocyanate
1,6-hexamethylene diisocyanate
1,7-heptamethylene diisocyanate
1,5-(2,2-dimethyl pentamethylene)-diisocyanate
1,8-octamethylene diisocyanate
1,5-(2,2,4-trimethyl-pentamethylene)-diisocyanate
1,9-nonamethylene diisocyanate
1,10-deca methylene diisocyanate
1,11-undeca-methylene-diisocyanate
1,12-dodeca methylene diisocyanate
3-bis-isocyanatopropyl ether
1,4-butanediol-bis-(3'-isocyanatopropyl)-ether
1,6-(3-methoxyhexamethylene)-diisocyanate
1,6-(3-butoxyhexamethylene)-diisocyanate
2,2'-diisocyanatoethylthioethane
3,3'-diisocyanato propylthiopropane
6,6'-diisocyanato hexylthiohexane
1,3-bis-(isocyanatomethyl)-benzene
1,4-bis-(isocyanatomethyl)-benzene
1,2-bis-(isocyanatomethyl)-cyclohexane
1,4-bis-(isocyanatomethyl)-cyclohexane
1,4-bis-(2'isocyanatoethyl)-cyclohexane
1,4-bis-(isocyanatomethyl)-naphthalene
1,5-bis-(isocyanatomethyl)-naphthalene
1-isocyanatomethyl-2-(3'-isocyanato)-propyl-3,5-dimethyl-cyclohexane
4,4'-bis-(3''-isocyanatopropyl)-biphenylene
1,3-cyclohexylene diisocyanate
1,4-cyclohexylene-diisocyanate
1-methyl-2,4-cyclohexylene-diisocyanate
1-ethyl-2,4-cyclohexylene diisocyanate
Bis-(4-isocyanatocyclohexyl)-methane
Bis-(2-methyl-4-isocyanatocyclohexyl) methane
Bis-(3-methyl-4-isocyanatocyclohexyl)-methane
Bis-(3,5-dimethyl-4-isocyanatocyclohexyl)-methane
4-isocyanatomethyl phenylisocyanate
4-(2'-isocyanatoethyl)-phenylisocyanate
3-(1'-isocyanatoethyl)-phenylisocyanate
3-(3'-isocyanatopropyl)-phenylisocyanate
4-(3'-isocyanatopropyl)-phenylisocyanate
3-(3'-isocyanatobutyl)-phenylisocyanate
4-(3'-isocyanatobutyl)-phenylisocyanate
tetrahydro-1,5-naphthylene diisocyanate
Bis-(4-isocyanatophenyl)-methane
1,3-phenylene diisocyanate
1,4-phenylene diisocyanate
1-methyl-2,4-phenylene diisocyanate
1-methyl-2,6-phenylene diisocyanate
1-methyl-2,5-phenylene diisocyanate
1-methyl-3,5-phenylene diisocyanate
1,3-dimethyl-2,4-phenylene diisocyanate
1,3-dimethyl-4,6-phenylene diisocyanate
1,4-dimethyl-2,5-phenylene diisocyanate
1-ethyl-2,4-phenylene diisocyanate
1-isopropyl-2,4-phenylene diisocyanate
Diethyl phenylene diisocyanate
Di-isopropylphenylene diisocyanate
1-chloro-2,4-phenylene diisocyanate
1-nitro-2,4-phenylene-diisocyanate
1,3-dichloro-4,6-phenylene-diisocyanate
1-chloro-4-methoxy-2,5-phenylene-diisocyanate
1-ethoxy-2,4-phenylene-diisocyanate
4-bis-isocyanatophenyl ether
2,4'-diisocyanatophenyl ether
1,4-naphthylene diisocyanate
1,5-naphthylene diisocyanate
2-6,naphthylene diisocyanate
2,7-naphthylene-diisocyanate
2,2'-(1,1'-dinaphthylene)-diisocyanate
2,4'-biphenylene-diisocyanate
4,4'-biphenylene diisocyanate
3,3'-dimethyl-4,4'-biphenylene diisiocyanate
2-nitro-4,4'-biphenylene diisocyanate
Bis-(4-isocyanatophenyl)-methane
Bis-(4-isocyanato-2-methylphenyl)-methane
Bis-(4-isocyanatophenyl)-dimethylmethane
Bis-(4-isocyanatophenyl)-cyclohexylmethane
3,3'-diisocyanatobenzophenone
4,4'-diisocyanato-3''-nitro-triphenyl methane
2,7-diisocyanatofluorene
2,6-diisocyanato-anthraquinone
3,6-diisocyanato-9-ethyl-carbazole
2,8-diisocyanato-chrysene
2,4-diisocyanatodiphenyl-sulfide
4,4'-diisocyanatodiphenyl sulfone
4,4'-diisocyanato-diphenylmethane-sulfone
2,4,6-triisocyanato-1-methyl-benzene
2,4,6-triisocyanato-1,3,5-trimethyl benzene
1,3,7-triisocyanato-naphthalene
2,4,4'-triisocyanato-biphenyl
Tris-(4-isocyanatophenyl)-methane
A dimer of 1-chloro-2,4-phenylene diisocyanate A dimer of 1-methyl-2,5-phenylene diisocyanate
Further:
dimeric 1-methyl-2,4-phenylene-diisocyanate of the formula

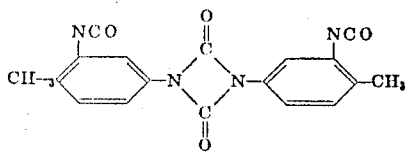

Preferably, those poly-isocyanates are used the reaction of which with the moisture of the atmosphere is very slow, as, for instance, the above-mentioned products of a reaction of a methyl-p-phenylene diisocyanate with a polyhydric alcohol, in which reaction the methyl-p-phenylene diisocyanate is applied in a stoichiometric surplus over the polyhydric alcohol such that one mole of diisocyanate is applied for each equivalent of hydroxyl groups.

Even relatively small quantities of the polyvalent isocyanates will, in general, be sufficient to bring about the desired improvement of the adhesion of the printing ink to a surface of a shaped body of regenerated cellulose. Generally, 0.3 to 10.0 percent by weight of the drying oil printing ink are applied. Preferably, about 1.0 to 5.0 percent by weight are used. The addition of the isocyanate to the printing ink also causes a quick air-drying of the printed ink.

No difficulties with regard to the printing inks are encountered when working according to the method of the present invention. The addition of the multivalent isocyanates does not cause a change of the shade of the printing ink. Moreover, over a period of several hours after addition of the isocyanates, no thickening of the printing inks will occur.

In the following examples, linseed oils of various viscosities have been used. They are defined as follows:

Boiled linseed oil of low viscosity: of about 20 poises at 20° C.

Boiled linseed oil of medium viscosity: of about 60 poises at 20° C.

Boiled linseed oil of high viscosity: of about 120 poises at 20° C.

*Example 1*

To 100 parts by weight of a printing ink of the following composition:

| | G. |
|---|---|
| Dyestuff Heliogen Blue B | 500 |
| Titanium white | 6000 |
| Boiled linseed oil (low viscosity) | 1400 |
| Boiled linseed oil (medium viscosity) | 2250 |
| Cobalt linoleate | 450 |
| Linseed oil resin varnish | 50 | were added 1.25 parts by weight of a solution consisting of 25 cc. of ethyl acetate and 75 g. of a polyisocyanate which results from the reaction of 1 mol of hexane triol (trimethylol propane) with 3 moles of 1-methyl-2,4-phenylene diisocyanate. A homogeneous mixture is made out of the printing ink and the polyisocyanate solution stated above. The printing ink thus obtained was immediately used for printing on regenerated cellulose sausage casings. After drying at the atmosphere, the sausage casings were kept in boiling water for 20 minutes. Thereafter, the characters imprinted onto the sausage casings had a fairly good resistance against scraping with the nail of the thumb.

When kept in a closed container, the ink could be used for printing the next day, even after the addition of the polyvalent isocyanate.

In practice, characters printed with the type of printing ink described in the present example have shown to withstand intense rubbing even after filling the casing with sausage meat and boiling for 30 minutes.

The polyvalent isocyanate mentioned above may be made as follows:

13.2 g. of 1.3.5-hexane triol are dissolved in 20 cc. of anhydrous ethyl acetate containing 1 cc. of pyridine and then dropwise added to a solution of 52.2 g. of 1-methyl-2,4-phenylene-diisocyanate in 30 cc. of ethyl acetate. The temperature rises to about 40° C. and is prevented from further rising by cooling the reaction mixture. As soon as the hexane triol solution has been added the reaction is complete. The solvent may be partially removed by evaporation.

The dyestuff Heliogen Blue B is described in Schultz, "Farbstofftabellen," 8th edition, supplementary volume 2, page 100, No. 1364b.

Titanium white means the dyestuff described in Schultz, "Farbstofftabellen," 7th Edition, supplementary volume 1, page 51, under No. 1418.

Polyvalent isocyanates of the kind referred to above are sold under the registered trademarks "Desmodur" TH and "Desmodur" THN. The TH brand contains some unreacted 1-methyl-2,4-phenylene diisocyanate, while the brand THN is generally free therefrom.

*Example 2*

To 100 parts by weight of a printing ink of the following composition:

| | G. |
|---|---|
| Gas soot | 2000 |
| Boiled linseed oil (medium viscosity) | 2150 |
| Dammar varnish | 2000 |
| Boiled linseed oil (low viscosity) | 1300 |
| Milori blue | 1450 |
| Boiled linseed oil (high viscosity) | 600 |
| Cobalt linoleate | 800 | were added 3.0 parts by weight of a mixture of 1-methyl-2,4-phenylene-diisocyanate and 1-methyl-2,6-phenylene diisocyanate and the whole was thoroughly mixed at room temperature. The resulting printing ink was used for printing for as long as about 6 hours after its preparation. Characters imprinted with this ink on regenerated sausage casings withstood a 15 minutes' boiling without loss of adhesion to the casing.

The dammar varnish stated above was composed of equal parts of dammar and turpentine.

*Example 3*

200 parts by weight of a printing ink having the following composition:

| | G. |
|---|---|
| Titanium white | 7400 |
| Linseed oil resin varnish | 500 |
| Dammar varnish | 300 |
| Boiled linseed oil (low viscosityl) | 900 |
| Boiled linseed oil (high viscosity) | 1700 |
| Cobalt linoleate | 300 | were intimately mixed at room temperature with 2 parts by weight of a siccative (drier), and 2.8 parts by weight of a solution consisting of 25 cc. of ethyl acetate and 75 g. of a polyvalent isocyanate which results from the reaction of 1 mol of hexane triol (trimethylol propane) with 3 moles of 1-methyl-2,4-phenylene-diisocyanate. The resulting printing ink was found to be stable for long periods of time, particularly when stored in a closed container, and about as suitable for printing on sausage casings which were to be treated with boiling water as the printing ink described in Example 1.

*Example 4*

1.5 parts by weight of the polyisocyanate described in

Example 1 and 100 parts by weight of a printing ink of the following composition:

| | G. |
|---|---|
| Dyestuff Heliogen Green G | 4300 |
| Boiled linseed oil (high viscosity) | 1150 |
| Boiled linseed oil (low viscosity) | 1700 |
| Hydrate of alumina | 2500 |
| Cobalt linoleate | 250 | were intimately mixed at room temperature until a homogeneous mass was obtained. When kept in a closed container, the resulting printing ink could be used for printing with very satisfactory results for as long as 24 hours after its preparation.

The dyestuff Heliogen Green G is described in Schultz, "Farbstofftabellen," 7th edition, supplementary volume 2, page 195.

Obviously, many modifications and variations of the present invention are possible in the light of the above teachings. It is, therefore, to be understood that within the scope of the appended claims the invention may be practiced otherwise than as specifically described.

What we claim is:

1. A regenerated cellulose sausage casing imprinted with a composition consisting essentially of an intimate mixture of a drying oil printing ink and an organic isocyanate having at least two reactive isocyanate groups in its molecule, said isocyanate constituting 0.3 to 10.0% by weight of said drying oil-printing ink.

2. A method of improving the resistance to boiling water of the printing on a regenerated cellulose sausage casing consisting in employing as the printing ink a drying oil-printing ink composition consisting essentially of an intimate mixture of a drying oil-printing ink and 0.3 to 10.0% by weight of said ink of an organic isocyanate having at least two reactive isocyanate groups in its molecule.

References Cited by the Examiner

UNITED STATES PATENTS

| 2,358,475 | 9/1944 | Pratt et al. | 106—252 |
| 2,449,613 | 9/1948 | Miller et al. | 260—97 XR |
| 2,886,455 | 5/1959 | Doggett et al. | 106—252 |
| 2,890,124 | 6/1959 | Mange | 106—23 |
| 2,890,125 | 6/1959 | Mange | 106—27 XR |
| 3,061,557 | 10/1962 | Hostettler et al. | 260—97 XR |

OTHER REFERENCES

Ellis, Printing Inks, Reinhold, New York City, 1940 (p. 377 relied on).

"Paint, Oil and Chemical Review," Dec. 17, 1953 (pages 28–30, "Isocyanates," relied upon).

ROBERT F. WHITE, *Primary Examiner.*

MORRIS LIEBMAN, ALEXANDER H. BRODMERKEL, *Examiners.*